Figure 1:
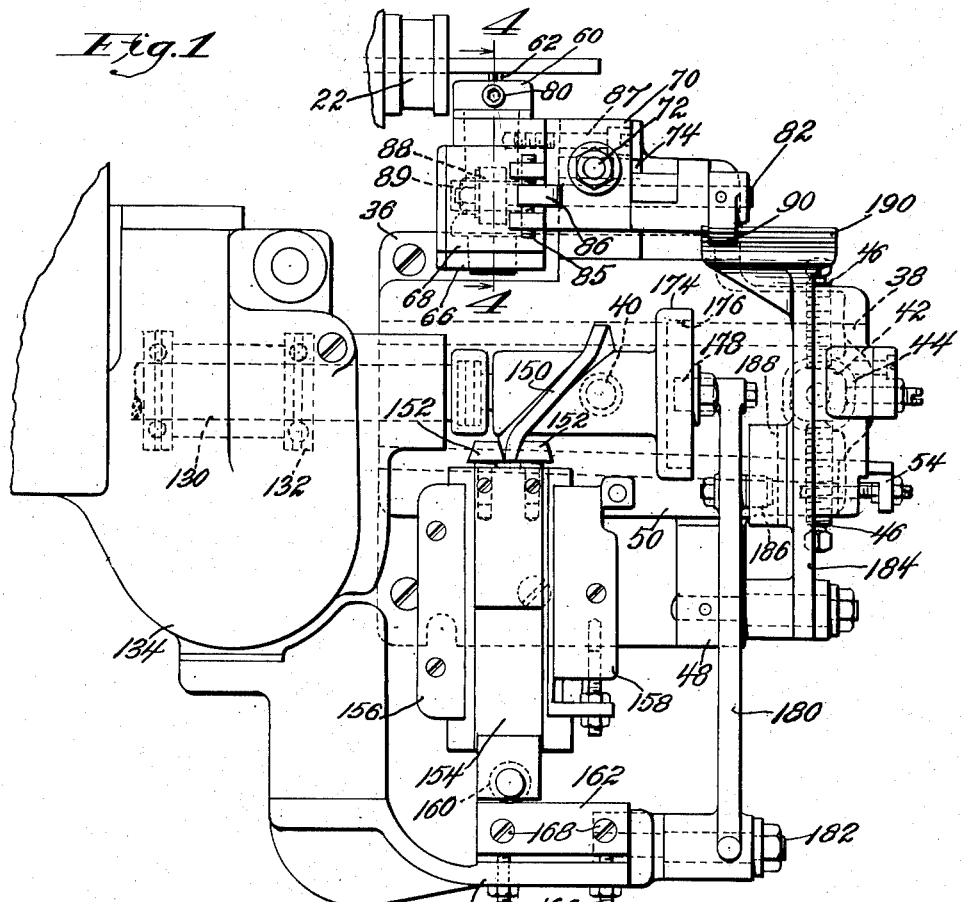

Feb. 10, 1953 — O. G. HOLMES — 2,627,618
AUTOMATIC SCREW AND SIMILAR MACHINE
Filed July 30, 1949 — 3 Sheets-Sheet 1

Witness
Jas. J. Maloney

Inventor
Ossian G. Holmes
by Maxwell Fish
Att'y

Feb. 10, 1953  O. G. HOLMES  2,627,618
AUTOMATIC SCREW AND SIMILAR MACHINE
Filed July 30, 1949  3 Sheets-Sheet 2
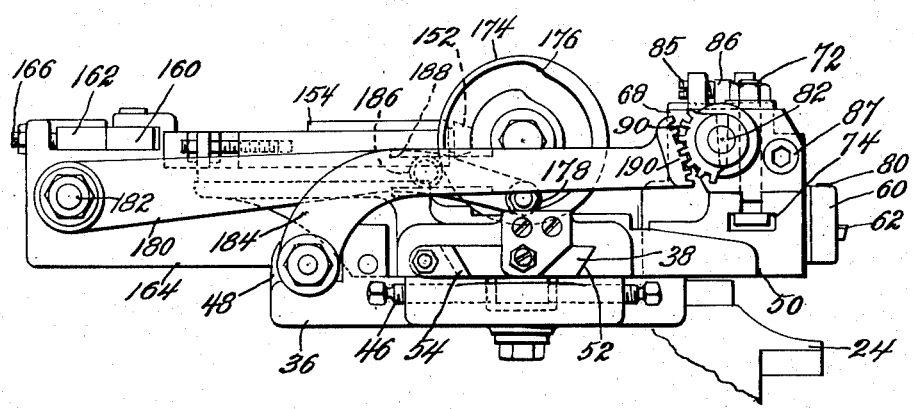
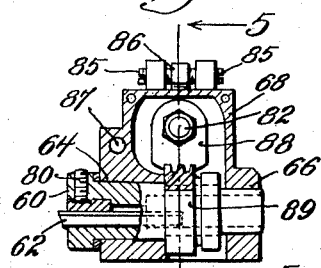
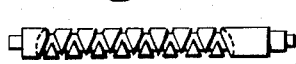
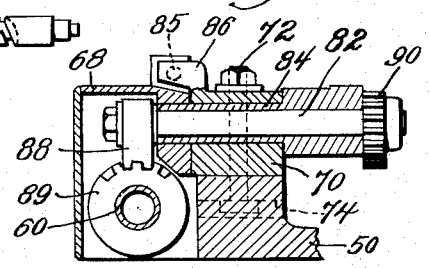
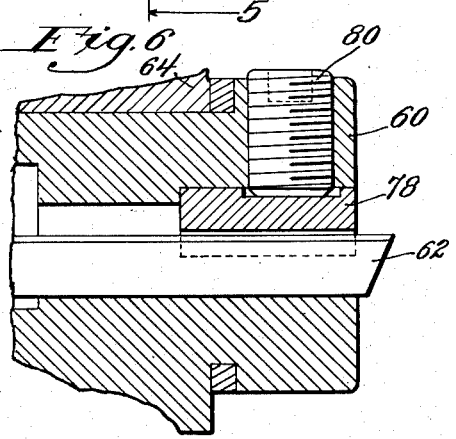
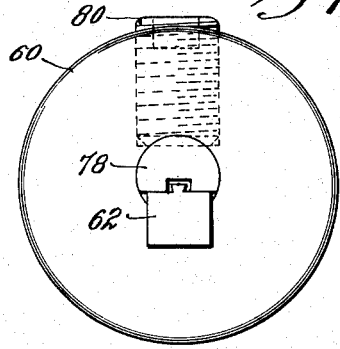
Inventor
Ossian G. Holmes
by Maxwell Fish
Att'y.

Feb. 10, 1953 — O. G. HOLMES — 2,627,618
AUTOMATIC SCREW AND SIMILAR MACHINE
Filed July 30, 1949 — 3 Sheets-Sheet 3

Witness
Jas. J. Maloney

Inventor
Ossian G. Holmes
by Maxwell Fish
Att'y

Patented Feb. 10, 1953

2,627,618

UNITED STATES PATENT OFFICE 2,627,618

AUTOMATIC SCREW AND SIMILAR MACHINE

Ossian G. Holmes, Riverside, R. I., assignor to Brown and Sharpe Manufacturing Company, Providence, R. I., a corporation of Rhode Island Application July 30, 1949, Serial No. 107,750

6 Claims. (Cl. 10—101)

1

The present invention relates to improvements in automatic screw and similar machines, and more particularly to an improved helical groove chasing attachment.

The helical groove chasing attachment which forms specifically the subject matter of the invention comprises a cutting tool, and a tool supporting assembly on which the tool is adapted for a traversing movement longitudinally of the rotating work axis for the formation of a helical cut in a cylindrical work piece, and for feeding movements in a direction normal to the work axis. In an attachment of this type it is required that the traversing movement and increments of feeding movement imparted to the tool be accurately timed with relation to the rotation of the work spindle so that the tool will move in precisely the same path over the work and at an increasingly greater depth for each of several successive passes of the tool required to produce a groove of the required depth. In the embodiment of the invention shown the attachment is set up for the manufacture of the traversing spindle of a fishing reel having an endless helical groove which extends for eight full turns in one direction and thereafter eight full turns in return.

The development of an attachment adapted for the performance of the endless helical groove chasing operation above described has involved considerable difficulty, particularly as regards the shaping of a tool which will be capable of cutting a straight-sided groove diagonally in each direction around a cylindrical work piece. It will be evident that a tool which is supported in the normal manner with the width of its cutting surface parallel to the rotational axis of the work must be sharply relieved on the right side of the tool during traverse to the right in order to avoid interference with the leading right hand side wall of the groove, and that the tool must also be sharply relieved on the left side thereof in order to avoid interference with the leading left hand side wall of the groove during the return traversing stroke of the tool. The amount of relief required for the chasing of a spiral groove which is narrow and deep and steeply pitched has been found to cause an excessive weakening of the cutting tool with a consequent tendency to breakage.

It is an object of the invention to provide an improved helical groove chasing attachment which is constructed and arranged to permit the use therewith of a groove cutting tool of substantially stronger construction than those which previously could be used having a cutting edge extending preferably the width of the groove to

2 be cut and having the adjacent side surfaces thereof undercut, or relieved, only to the relatively small extent which would normally be required for the cutting of annular grooves where the position of the tool is at all times parallel to the direction of the cut.

More specifically it is an object of the invention to so control the position or set of the tool in relation to the work at all times during the cutting of an endless helical groove so that the position of the tool is maintained parallel to the direction of cut irrespective of variation in the pitch angle of the groove which changes from a maximum angle of pitch in one direction to zero at the end of the traverse, and thereafter to a maximum angle of pitch in the opposite direction during the return traverse of the tool.

Figure 2:
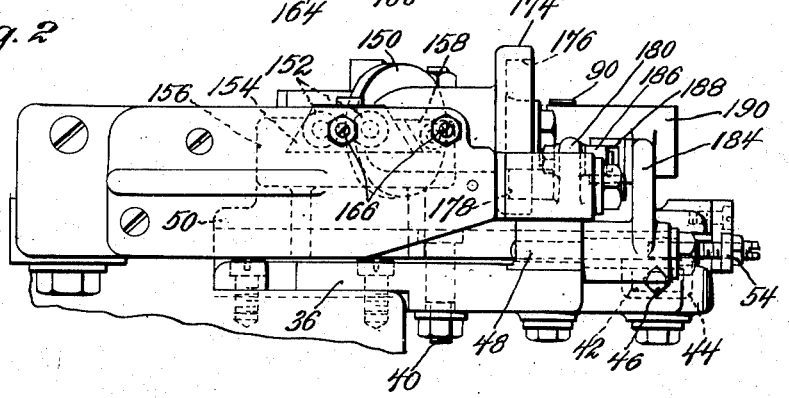
Figure 9:
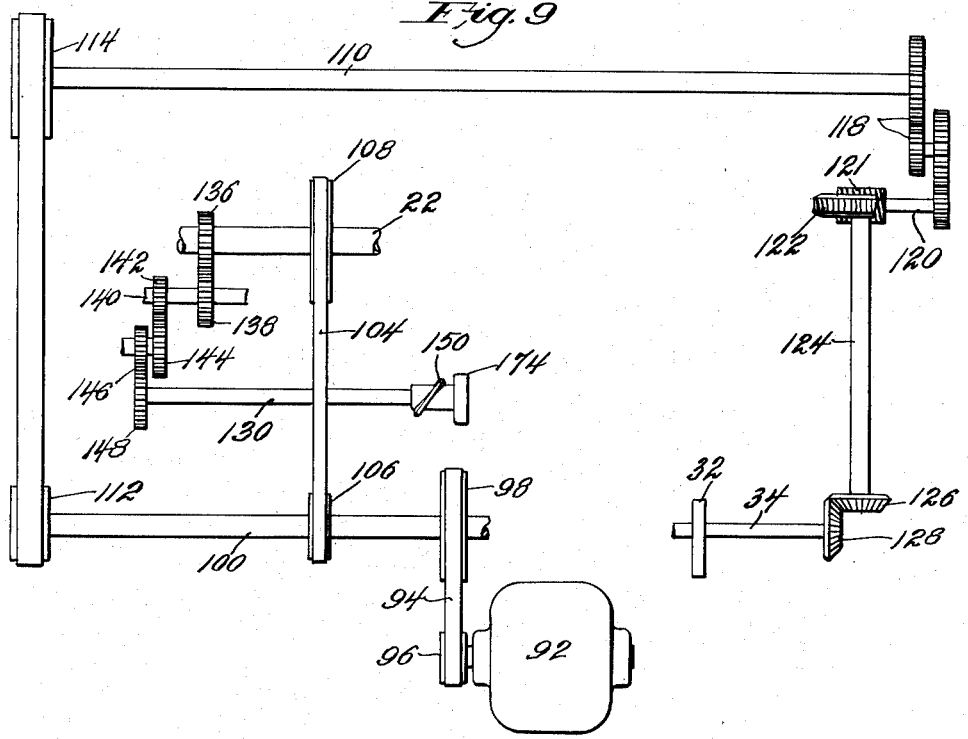
Figure 10:
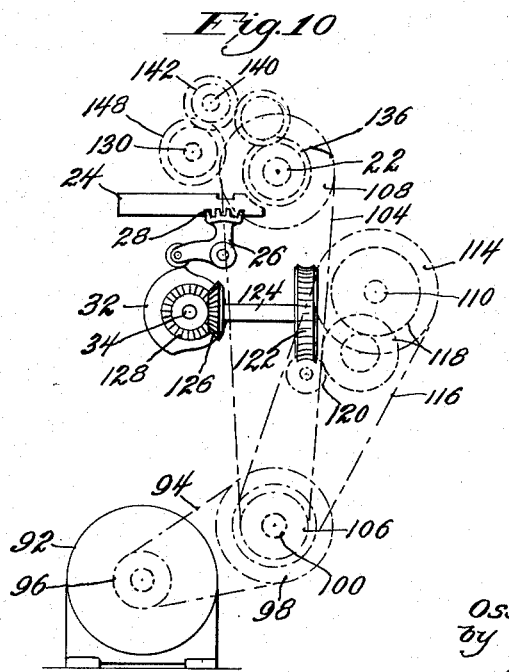

With these and other objects in view as may hereinafter appear, the several features of the invention consist in the devices, combinations, and arrangement of parts hereinafter described and claimed, which, together with the advantages to be obtained thereby, will be readily understood by one skilled in the art from the following description taken in connection with the accompanying drawings, in which Fig. 1 is a plan view of an automatic screw machine illustrating a preferred form of my groove chasing attachment, only so much of the machine being shown as believed necessary to illustrate the connection of the present invention therewith; Fig. 2 is a view of the front elevation of substantially the parts shown in Fig. 1; Fig. 3 is a view of the right side elevation of substantially the parts shown in Fig. 1; Fig. 4 is a detail section looking from the left taken on a line 4—4 of Fig. 1 to illustrate details of the tool holder, its housing, and actuating connections; Fig. 5 is a sectional view taken on a line 5—5 of Fig. 4; Fig. 6 is a detailed sectional view on an enlarged scale illustrating the chasing tool and the holder in which it is supported; Fig. 7 is an end view of the parts shown in Fig. 6 looking from the right; Fig. 8 is a view of the fishing reel traversing spindle formed by the machine; Fig. 9 is an expanded and somewhat diagrammatic plan view of the driving connections to the work spindle and the front cross slide, and the driving connections from the work spindle to the auxiliary cam shaft which carries the tool traversing and tool holder rocker cams for the present attachment; and Fig. 10 is a diagrammatic view looking from the right end of the machine showing substantially the parts illustrated in Fig. 9, but in their proper relation.

The endless helical groove chasing attachment for an automatic screw machine herein disclosed as embodying in a preferred form the several features of the invention comprises a front tool slide having a transverse movement for feeding the tool toward the work, a tool carriage movable longitudinally of the work rotational axis on the tool slide for imparting longitudinal traversing movements to the tool, and a tool holder which is supported on the tool carriage for rotational movement on the longitudinal axis of the tool bit.

The actuating mechanism for the attachment includes the usual motor drive for continuously rotating the work spindle and cam and follower connections driven in timed relation thereto for operating the front tool slide to impart successive increments of feeding movement to the tool. In accordance with the invention there is also provided with the present attachment a secondary cam shaft which is disposed parallel to, and is driven from the work spindle in timed relation thereto. A spiral rib cam on the auxiliary cam shaft acts through a follower slide connection to impart longitudinal traversing movement to the tool carriage and operating tool. A rocker face cam also mounted on the auxiliary cam shaft acts through follower connections to impart rocking movements to the tool holder so that the operating tool is maintained at all times in a position parallel to the groove being cut at the point of cutting contact. In the illustrated construction the auxiliary cam shaft is driven through reduction gearing arranged to cause the auxiliary cam shaft to turn one revolution for each sixteen turns of the work spindle. With this construction and arrangement of the attachment, the tool is traversed forward and back across the work to form eight right hand turns and eight left hand turns in a closed path. While traversing to the right, the tool is correspondingly rocked to a tipped position in which it is parallel to the groove at the point of cutting contact. When the pitch angle of the groove is reduced to zero and is then increased to a maximum on the opposite side with the stopping and reversal of traverse of the tool at the end of its traverse to the right, the tool is rocked first to an upright position and then to a tipped position to the left.

When the tool reaches the left hand end of its travel, the tool is again rocked first to its upright position and then to its tipped position to the right completing the cycle.

Referring specifically to the drawings in which only so much of an automatic screw machine of conventional design is shown as believed necessary to illustrate the connection of the present invention therewith, the continuously driven work spindle of the machine through which bar stock is fed is generally indicated at 22. The groove chasing attachment consists specifically of an assembly of tool supports which in the preferred form of the invention shown, include the usual transversely movable screw machine front tool slide 24 (see Figs. 3 and 10), which is actuated by cam and follower connections including a cam 32 carried on a front cam shaft 34 of the machine and a bell crank lever 26 having a horizontally disposed cam follower arm and an upwardly disposed gear segment arranged for engagement with a rack 28 on the under side of the front tool slide 24. A tool carriage supporting bracket 36 is rigidly secured to the front tool slide 24 and provides support for an adjustable dovetail tool carriage way 38 extending generally in a line parallel to the axis of rotation of the work spindle. The tool carriage way 38 is pivotally supported at 40 on the bracket 36 and carries at its outer end on the underside thereof a square block 42 which fits into a somewhat larger recess 44 in the bracket 36 and is adapted to be engaged at each side thereof by adjustable set screws 46 mounted in the bracket and extending laterally into engagement with opposite sides of the block 42. The bracket 36 also has mounted thereon a bearing lug 48 for a tool holder actuating lever hereinafter more fully to be described.

A tool carriage 50 is mounted on the support assembly including the front slide 24 and bracket 36 for traversing movement longitudinally of the work spindle. The tool carriage is provided for this purpose on its under side with under cut guide-ways 52 which engage with the tool carriage way 38. An adjustable gib 54 is provided to maintain a tight operating fit between the way 38 and carriage 50.

A tool holder 60, which provides support for a cutting tool 62, is mounted on the tool carriage 50 for rotational movements and for a limited vertical adjustment with relation thereto. The tool holder 60 is tubular in shape and is mounted to turn in bearings 64, 66 formed in a tool holder housing 68 which is in turn supported from a bracket 70 secured to the tool carriage 50 by means of a T bolt 72 which fits into a longitudinally extending T slot 74 in the tool carriage. The cutting tool or bit 62 provided for use with the present attachment comprises a square rod with a rib portion extending along the top surface thereof, which forms the cutting edge of the tool, the two sides of the rib, which form the adjacent sides of the cutting edge being undercut so that these surfaces will be sufficiently backed off or relieved to avoid interference between the side portions of the tool and the sides of the grooves being cut thereby. The tool bit 62 provided for use with the present attachment is similar to those normally employed for the cutting of annular grooves, the sides of the cutting edge or rib being undercut only by the relatively small amount required to provide relief for a tool which is set in a position parallel to the direction of cut. The tool bit 62 is rigidly supported within the holder 60 by means of a clamping member 73 and a clamping screw 80 threaded into the flanged outer end of the tool holder 60.

The tool holder housing 68 is supported from the bracket 70 to turn about the axis of an actuating shaft 82, through which rocking movements are imparted to the tool holder 60 and which is mounted to turn in a bushing 84 secured to the bracket 70. The housing 68 is pivotally supported on an extended portion of the bushing 84 and shaft 82, and is supported in the desired position of angular adjustment with relation to the bracket by the engagement of two adjustable stop screws 85 mounted in upstanding lugs on the housing 68 with an interposed nib 86 formed on the bracket 70. The housing is then rigidly secured to the bracket by means of a clamping screw 87 which extends longitudinally of the work spindle through an oversized aperture in the bracket and is threaded into the housing 68. The actuating shaft 82 above referred to is provided at one end with a spiral gear segment 88 which meshes with a cooperating spiral gear segment 89 on the tool holder 60. At its other end the operating shaft 82 carries a gear segment 90 which is arranged to be actuated by connections from the attachment rocker by means of the tool holder rocker cam hereinafter to be described.

The driving connections of the machine which are employed to drive the tool spindle and front tool slide together with the added connections for driving the attachment parts provided in accordance with the present invention will be described with particular reference to the diagrammatical views, Figs. 9 and 10. As indicated in these figures, power is taken from an electrical motor 92 which is connected by means of a chain 94 and sprockets 96, 98 with a main drive shaft 100. The work spindle of the machine, designated at 22, is driven from shaft 100 by means of a chain 104 and sprockets 106, 108. The connections provided for driving the front tool slide operating cam 32 include a rear cam shaft 110 which extends along the rear side of the machine, and is driven from the main cam shaft 100 by sprockets 112, 114 mounted respectively on the main cam shaft 100 and rear shaft 110, and a driving chain 116. The shaft 110 is connected at its outer end by means of pick-off gears 118 to a worm shaft 120 which is in turn connected through a worm 121 and wheel 122, an intermediate shaft 124, and bevel gears 126, 128 to the front cam shaft 34 which supports the front slide operating cam 32.

With the preferred construction shown traversing movements longitudinally of the work axis and rocking movements in accordance with the invention are imparted to the grooving tool through connections operated by cams mounted on an auxiliary cam shaft 130 which is continuously driven in a predetermined timed relation to the rotation of the work spindle 22. Auxiliary cam shaft 130 is rotatably supported in a bearing 132 carried in an attachment housing 134 on the machine and is arranged to be driven from the work spindle 22 by means of pick-off reduction gears including a gear 136 on the spindle, a gear 138 mounted on a jack shaft 140, and pick-off gears 142, 144, 146, 148, of which the latter is carried on the auxiliary cam shaft 130.

A cam 150 in the form of a spiral rib on the auxiliary cam shaft 130 is provided for imparting traversing movement to the tool carriage 50 (see Figs. 1, 2, and 3). The follower for the cam 150 comprises a pair of tapered rolls 152 which are supported on a slide 154 for engagement with opposite sides of the rib. The slide 154 is in turn supported in a guideway formed by two roll slide holders 156, 158 secured to the top surface of the tool carriage 50, this arrangement being such as to permit lateral movement of the tool carriage 50 relatively to the roll slide 154 with the front tool slide while compelling the tool carriage 50 to move longitudinally of the tool spindle with the roll slide 154 in a traversing movement determined by the shape of the spiral cam rib 150. In order to maintain a tight operating fit between the follower rolls 152 and the cam rib 150, the slide 154 is provided at the end opposite rolls 152 with a follower roller 160 which engages against a guide surface formed on the forward edge of a guide plate 162 adjustably secured to a bracket 164 bolted to the attachment housing 134. As best shown in Fig. 1, the position of the guide plate 162 is adjustably determined by means of adjustable stop screws 166 which engage the edge of the guide plate opposite to the roller 160. The guide plate is then secured in its adjusted position by means of clamping screws 168. In the illustrated construction a traversing cam is employed which turns once for each sixteen turns of the work and acts to traverse the tool forward and back across the work to form eight right hand turns followed by eight left hand turns in a closed path.

Rocking movements are imparted to the tool holder by means of a cam 174 mounted on the right hand end of the auxiliary cam shaft 130 as shown in Fig. 1 and having formed in the face thereof a closed cam groove 176. The cam groove 176 is engaged by a follower roller 178 carried by a horizontally disposed cam lever 180 which is pivotally supported from a pivot pin 182 carried on the stationary bracket 164. The oscillatory movements imparted to the cam lever 180 by the rotation of the cam 174 are transmitted to an actuating lever 184 supported in parallel relation thereto by means of a roller 186 mounted on cam lever 180 which engages with a horizontally disposed follower groove 188 on the actuating lever 184. The actuating lever is pivotally supported from the bearing lug fixedly secured to the bracket 36 carried by the front tool slide and at its free end carries an elongated gear segment 190 which is maintained at all times in engagement with the gear segment 90 on the tool holder rocker actuating shaft 82. With this arrangement of parts it will readily be seen that the up and down movements of the rocker cam lever 180, mounted on a relatively stationary part of the machine, are transmitted to the actuating lever 184 movable with the front cross slide through the sliding connection provided by the roller 186 and follower groove 188, and are thereafter transmitted from the actuating lever 184 to the tool holder carried on the longitudinally movable tool carriage through the sliding connection provided between the gear segment 190 and gear segment 90.

It will be understood that the invention is not limited to the specific embodiment shown, and that various diversions may be made therefrom without departing from the spirit and scope of the appended claims.

1. In a screw machine, the combination with a driven work spindle, and a tool slide mounted for travel in a path transverse to the axis of the spindle, of a tool carriage mounted on said slide for movement in a path parallel to the axis of the spindle, a tool holder rotatably supported on the tool carriage for rocking movement about an axis transverse to the work axis, and actuating means including a tool slide operating cam, a tool carriage operating cam, and a toolholder operating cam, and means for driving each of said cams and work spindle in timed relation with one another in accordance with an automatic cycle, connections from the respective cams for moving said tool carriage and tool slide with relation to the work spindle for causing a tool mounted thereon to cut a helical groove of varying pitch in the work, and an actuating connection from the toolholder operating cam timed with relation to the movements of said carriage and slide for rocking the tool holder in a direction and to an extent corresponding with the pitch of said groove whereby the relation of the tool to the contacting sides of the groove is maintained substantially unchanged.

2. In a screw machine having a rotary work spindle, a front tool slide movable in a path transverse to the rotational axis of the work spindle, and driving connections for rotating the spindle and for actuating the slide in timed relation, the combination of a helical groove chasing attachment which comprises a tool carriage slidably mounted on the tool slide for traversing movement longitudinally of the work spindle, a tool holder for a groove chasing tool, and a housing on the tool carriage within which the holder is rotatable on an axis substantially normal to the work axis, and cam and follower connections operable in timed relation with the rotary work spindle in accordance with an automatic cycle for actuating each of said tool slide, and tool carriage for cutting a helical groove of varying pitch in the work, and for rocking the tool holder in timed relation to the rotation of the spindle in a direction and to an extent corresponding with the pitch of said groove whereby the tool bit is maintained continuously in a position parallel to the groove helix at the point of cutting contact.

3. In a screw machine, the combination with a driven work spindle, and a tool slide mounted for travel in a path transverse to the rotational axis of the spindle, of a helical groove chasing attachment comprising a tool carriage mounted on said slide for movement in a path parallel to the axis of the spindle, a tool holder rotatably supported on the tool carriage for rocking movement about an axis transverse to the work axis and passing substantially through the point of contact of the tool and the work, and actuating means for said tool slide, tool carriage and work holder including a cam shaft parallel to the work spindle and supported in a relatively fixed position on the machine, a traversing cam thereon, a follower transversely movable on the tool carriage for engagement with the cam to cut a closed helical groove, a tool holder rocker cam on the cam shaft, and follower connections therefrom including a motion transmitting element mounted on the tool carriage for imparting rocking movements to the tool holder in a direction and to an extent corresponding with the pitch of said groove to maintain a constant parallel relation between the tool and the helical groove formed by the tool at the point of cutting contact.

4. In a screw machine, the combination with a machine frame, a driven work spindle, and a tool slide mounted for travel in a path transversely of the axis of the spindle, of a tool carriage mounted on said slide for movement in a path parallel to the axis of the spindle, a tool holder rotatably supported on the tool carriage for rocking movement about an axis transverse to the work axis and passing substantially through the point of contact of the tool and the work, and actuating means including a cam shaft rotatably supported on the machine frame parallel to the work spindle, a traversing cam thereon, a follower transversely movable on the tool carriage for engagement with the cam, a tool holder rocker cam on the cam shaft, a cam lever for said rocker cam pivotally supported on the machine frame, a tool holder rocker lever pivotally supported on the tool slide, and an operating connection from the rocker cam lever for actuating said tool holder rocker lever, an actuating shaft on the tool carriage parallel to the spindle axis, a gear segment and pinion connection between the tool holder rocker lever and said actuating shaft, and a helical gear-toothed driving connection between the actuating shaft and tool holder.

5. In a screw machine having a rotary work spindle, a front tool slide movable in a path transverse to the rotational axis of the work spindle, and driving connections for rotating the spindle and for actuating the slide in timed relation, the combination of a helical groove chasing attachment which comprises a tool carriage slidably mounted on the tool slide for traversing movement longitudinally of the work spindle, a tool holder for a groove chasing tool, and a housing on the tool carriage within which the holder is rotatable on an axis substantially normal to the work axis, and actuating means for said tool slide, tool carriage, and tool holder, including a tool slide actuating cam synchronized with relation to the rotary work spindle, an auxiliary cam shaft, a spiral traversing cam on said shaft, and connections therefrom for imparting longitudinal traversing movements to the tool carriage, a rocker cam on said shaft, and connections therefrom including a rocker cam follower for imparting rocking movements to the tool holder to maintain a constant parallel relation between the tool and the helical groove formed by the tool at the point of cutting contact.

6. In a screw machine having a rotary work spindle, a front tool slide movable in a path transverse to the rotational axis of the work spindle, and driving connections for rotating the spindle and for actuating the slide in timed relation, the combination of a helical groove chasing attachment which comprises a tool carriage slidably mounted on the tool slide for traversing movement longitudinally of the work spindle, a tool holder adapted to receive a groove chasing tool, mounted on the tool carriage and rotatable on an axis which is substantially normal to the work axis and passes through the point of engagement of the tool with the work, and actuating means for said tool slide, tool carriage, and tool holder, including a relatively stationary cam shaft, a traversing cam on the cam shaft and follower connections therefrom for imparting longitudinal traversing movements to the tool carriage, a tool holder rocker cam on the cam shaft, and a cam follower lever arranged to turn about a relatively stationary pivot, an actuating lever supported from the tool slide, engaging elements providing an operating sliding connection between said levers, an actuating shaft on the tool carriage rotatable to rotate the tool holder, and engaging elements providing an operating sliding connection between the actuating lever and actuating shaft.

OSSIAN G. HOLMES.

REFERENCES CITED

The following references are of record in the file of this patent:

UNITED STATES PATENTS

| Number | Name | Date |
| --- | --- | --- |
| 775,613 | Stadler | Nov. 22, 1904 |
| 2,084,988 | Eckardt et al. | June 22, 1937 |
| 2,362,967 | Bivans | Nov. 21, 1944 |

FOREIGN PATENTS

| Number | Country | Date |
| --- | --- | --- |
| 298,795 | Germany | June 27, 1917 |
| 449,555 | Germany | Sept. 21, 1927 |
| 579,867 | Germany | July 8, 1933 |